United States Patent
Panchal et al.

(10) Patent No.: US 11,202,193 B2
(45) Date of Patent: *Dec. 14, 2021

(54) UNIFIED RADIO ACCESS NETWORK (RAN)/MULTI-ACCESS EDGE COMPUTING (MEC) PLATFORM

(71) Applicant: Verizon Patent and Licensing Inc., Basking Ridge, NJ (US)

(72) Inventors: Jignesh S. Panchal, Hillsborough, NJ (US); Ratul Kumar Guha, Kendall Park, NJ (US); Kalyani Bogineni, Hillsborough, NJ (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 97 days.

This patent is subject to a terminal disclaimer.

(21) Appl. No.: 16/804,295

(22) Filed: Feb. 28, 2020

(65) Prior Publication Data

US 2020/0204977 A1    Jun. 25, 2020

Related U.S. Application Data

(63) Continuation of application No. 16/058,753, filed on Aug. 8, 2018, now Pat. No. 10,609,546.

(51) Int. Cl.
| | |
|---|---|
| *H04W 4/00* | (2018.01) |
| *H04W 8/08* | (2009.01) |
| *H04L 12/875* | (2013.01) |
| *H04W 40/12* | (2009.01) |
| *H04L 12/26* | (2006.01) |
| *H04W 72/08* | (2009.01) |

(Continued)

(52) U.S. Cl.
CPC ......... *H04W 8/082* (2013.01); *H04L 43/0858* (2013.01); *H04L 45/121* (2013.01); *H04L 47/56* (2013.01); *H04W 40/12* (2013.01); *H04W 72/087* (2013.01); *H04W 8/20* (2013.01)

(58) Field of Classification Search
None
See application file for complete search history.

(56) References Cited

U.S. PATENT DOCUMENTS

| | | | |
|---|---|---|---|
| 2013/0288729 A1 | 10/2013 | Islam | |
| 2017/0048876 A1* | 2/2017 | Mahindra | ............. H04M 15/66 |

(Continued)

*Primary Examiner* — Bob A Phunkulh

(57) ABSTRACT

A device can receive, from a node in a core network, application identifiers associated with applications accessible by a first user device. The application identifiers can be associated with latency requirements. The device can obtain, from the first user device, a first packet associated with a first packet flow. The device can compare information regarding the first packet flow, and the application identifiers to determine that the first packet is destined for a low-latency application having a specified latency range. The device can identify a first low-latency bearer that satisfies the specified latency range associated with the low-latency application. The device can map the first packet flow to the first low-latency bearer, and communicate packets, associated with the first packet flow, using the first low-latency bearer. The packets can include data packets communicated between an entity hosting the low-latency application and the first user device, while bypassing the core network.

20 Claims, 8 Drawing Sheets

(51) Int. Cl.
*H04L 12/727* (2013.01)
*H04W 8/20* (2009.01)

(56) References Cited

U.S. PATENT DOCUMENTS

| | | | |
|---|---|---|---|
| 2017/0105216 A1 | 4/2017 | Jung | |
| 2018/0183855 A1* | 6/2018 | Sabella | G06F 9/505 |
| 2018/0248787 A1 | 8/2018 | Rajagopal | |
| 2018/0263039 A1* | 9/2018 | Fang | H04W 72/0493 |
| 2018/0270743 A1 | 9/2018 | Callard | |
| 2018/0352594 A1 | 12/2018 | Iwai | |
| 2018/0367637 A1 | 12/2018 | Balazinski | |
| 2019/0028934 A1 | 1/2019 | Rasanen | |
| 2019/0042318 A1 | 2/2019 | Ljung | |
| 2019/0044740 A1* | 2/2019 | Smith | H04L 9/0822 |
| 2019/0098676 A1 | 3/2019 | Svennebring | |
| 2019/0104030 A1 | 4/2019 | Giust | |
| 2019/0254108 A1 | 8/2019 | Iwai | |
| 2019/0394672 A1* | 12/2019 | Mukherjee | H04L 47/20 |
| 2020/0007460 A1* | 1/2020 | Guim Bernat | G06F 9/5011 |
| 2020/0067926 A1* | 2/2020 | Smith | H04W 4/38 |
| 2020/0351637 A1* | 11/2020 | Wang | H04W 8/18 |
| 2021/0076180 A1* | 3/2021 | Parker | H04W 4/80 |
| 2021/0076250 A1* | 3/2021 | Wang | H04L 67/306 |
| 2021/0099316 A1* | 4/2021 | Wang | H04M 15/64 |

* cited by examiner

UNIFIED RADIO ACCESS NETWORK (RAN)/MULTI-ACCESS EDGE COMPUTING (MEC) PLATFORM

RELATED APPLICATION

This application is a continuation of U.S. patent application Ser. No. 16/058,753, filed Aug. 8, 2018, which is incorporated herein by reference.

BACKGROUND

Multi-access edge computing (MEC) refers to computing services provided at the edge of a network, to facilitate real-time, high-bandwidth, low-latency access to content. MEC allows users to access a larger number of connected applications and devices, by using the network's edge to bring services closer to the user.

DETAILED DESCRIPTION OF PREFERRED EMBODIMENTS

Figure 1A:
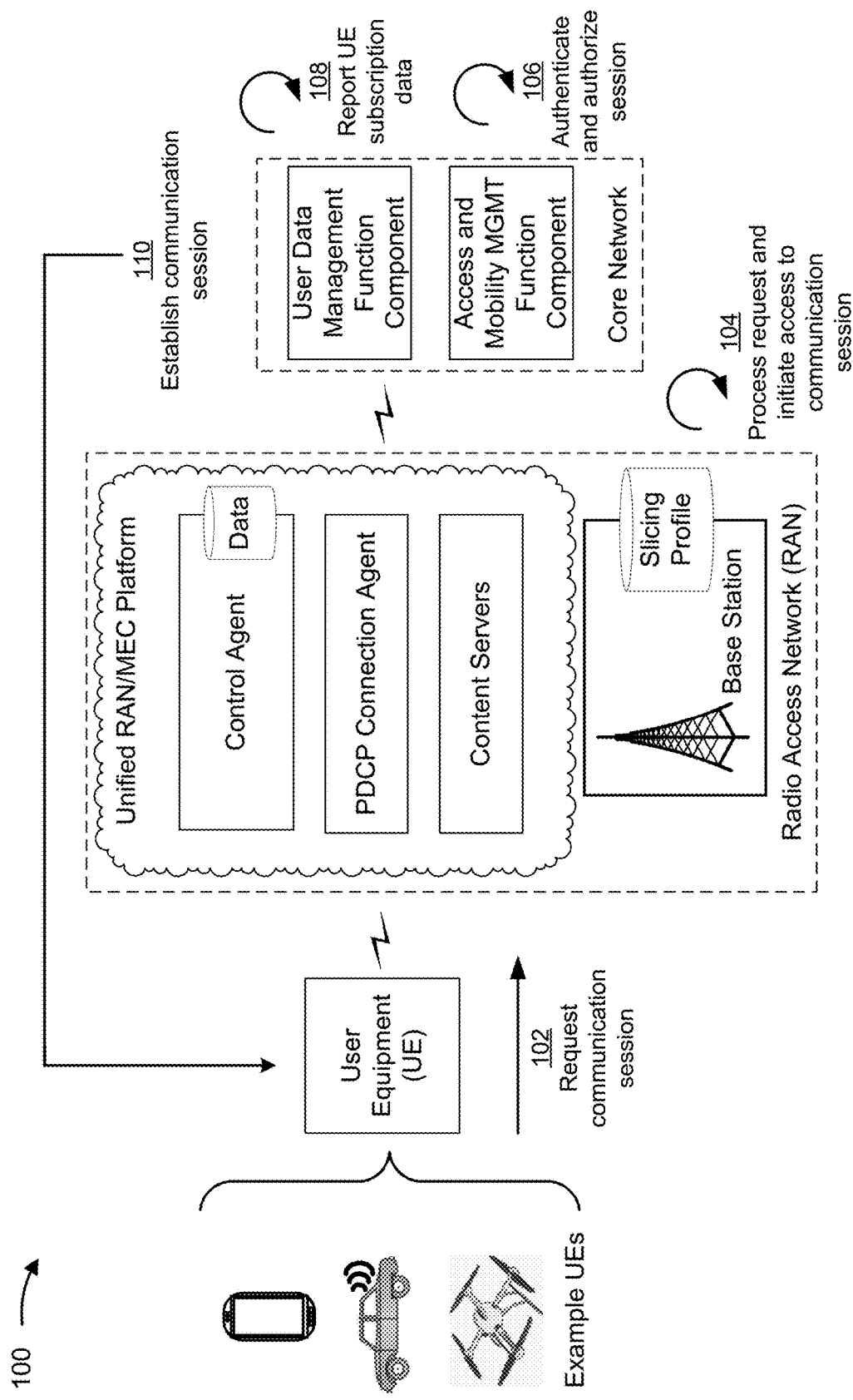
FIGS. 1A-1D are diagrams of an example implementation described herein.

The following detailed description of example implementations refers to the accompanying drawings. The same reference numbers in different drawings can identify the same or similar elements.

Existing mechanisms for establishing connections, and communicating data, between user devices and content servers (e.g., applications servers), are characterized by the demarcation of application, radio access network (RAN), and core network functionalities. For example, devices in the RAN (e.g., base station devices) must perform a number of functions prior to establishing a connection between a user device and a core network, and devices in the core network (e.g., data center devices) must perform a number of functions prior to establishing a connection between the user device and a content server associated with a packet data network. Such function-to-function distinction introduces latency, or delay, in the amount of time it takes a user device to obtain data from a content server located in a packet data network. The amount of latency associated with communicating data between the user device and the content server further increases, where the distance between the user device and devices in the core network, such as devices provided in remotely located data centers, increases.

Some implementations described herein provide a unified RAN/multi-access edge computing (MEC) platform, which integrates and/or co-locates RAN functionalities, core network functionalities, application functionalities, and/or multi-access edge computing (MEC) functionalities, as described herein, by which a user device can obtain content (e.g., data, packets, and/or the like), from a content server provided at an edge of a RAN network, at extremely low latencies (e.g., less than 10 milliseconds (ms), less than 5 ms, less than 1 ms, and/or the like). For example, the unified RAN/MEC platform can detect and isolate data destined for low-latency applications, and bifurcate the processing of such data based on determining whether the data is destined for a low-latency application (e.g., a gaming application, an intelligent transportation (vehicle-to-vehicle) application, an unmanned aerial vehicle (UAV) application, a robotic application, a remote surgical application, and/or the like). In this way, data destined for low-latency applications can be processed and/or served locally, by the unified RAN/MEC platform, by way of a low-latency bearer established between the user device and the unified RAN/MEC platform. In this way, the user device can access content from the edge of the RAN network by way of the unified RAN/MEC platform, which obviates the need for signaling across the core network, including signaling across backhaul portions of the core network. In this way, core network storage, signaling, and/or computing resources, which would otherwise be wasted performing inefficient and/or time-consuming processes, can be obviated, and/or conserved. In this way, the unified RAN/MEC platform can establish local low-latency bearers with a user device, which bypass the core network, and satisfy low-latency requirements necessary to perform the low-latency applications, increase network reliability, increase quality of service (QoS), exhibit improved efficiency of network resources, and/or the like, as set forth herein.

FIGS. 1A-1D are diagrams of an example implementation 100 described herein. As shown in FIGS. 1A-1D, example implementation 100 can include a user device, or user equipment (UE), wirelessly connected to a RAN, which can be connected (e.g., by wired or wireless connections) to a core network. The RAN can include a base station and a unified RAN/MEC platform communicatively coupled to the base station.

Briefly, and in some implementations, the unified RAN/MEC platform can be provided at an edge of the RAN network, between the RAN network and the core network, by which the unified RAN/MEC platform can obtain information, from the core network, and deliver content directly to the UE by way of a low-latency bearer established between the UE and the unified RAN/MEC platform. The unified RAN/MEC platform can include a control agent, configured to implement control over the services, policies, quality, and/or the like, associated with a communications session established between the UE and the unified RAN/MEC platform, a Packet Data Convergence Protocol (PDCP) connection agent, configured to bifurcate the processing and/or serving of data between the unified RAN/MEC platform and the core network, and one or more content servers (e.g., application servers), configured to provide and/or serve content to the UE, while bypassing the core network, as described herein. Such content can include, for example, data obtained from a low-latency application by way of a low-latency bearer, as described herein. In some implementations, the UE, the RAN (i.e., including the unified RAN/MEC platform), and the core network can be included in a mobile network, such as a fourth generation (4G) mobile network, a fifth generation (5G) mobile network, and/or the like.

In some implementations, the unified RAN/MEC platform can obtain data, in the form of data packets, generally referred to as packets, from the UE by way of a PDCP connection agent that is co-located with the unified RAN/MEC platform. The PDCP connection agent can include a user plane (e.g., data plane) configured to receive packets from a radio link control (RLC) layer of the base station. In some implementations, the PDCP connection agent is configured to obtain the packets by way of a mapping table (e.g., a slicing profile) provided at the RLC layer. The PDCP connection agent can be virtualized, and co-located with the unified RAN/MEC platform, by splitting the user plane data and the control plane data in the PDCP sub-layer of the radio protocol stack. The RLC layer can map packets associated with one or more packet flows, and/or latency requirements (e.g., low-latency requirements), to the PDCP connection agent. In this way, the PDCP connection agent can obtain packets from a UE, map the packets to a low-latency bearer, and bifurcate the processing of such packets, between the core network and the unified RAN/MEC platform, based on determining whether the packets are destined for a low-latency application that requires a low-latency bearer.

For example, in some implementations, the RLC layer can map predetermined packet flows to the PDCP connection agent. The PDCP connection agent can receive packets associated with the predetermined packet flows, examine the packets, and send the packets for local processing, by the unified RAN/MEC platform, based on determining that the packets are destined for low-latency applications. The PDCP can send the packets destined for low-latency applications by way of identifying (e.g., establishing) low-latency bearers, and mapping the packets, destined for low-latency applications, to the low-latency bearers to satisfy the required latency associated with the low-latency applications. The packets can be communicated between the UE and the unified RAN/MEC platform using the low-latency bearers, and bypass the core network. In this way, latency associated with transmitting packets can be reduced, by way of the packets traversing shorter distances between the UE and the unified RAN/MEC platform provided at the edge of the RAN.

In some implementations, the unified RAN/MEC platform can communicate with the core network for obtaining information regarding the applications, services, sessions, policies, and/or the like, assessible by and/or otherwise associated with the UE. For example, the unified RAN/MEC platform can communicate with an access and mobility management function component (e.g., a Mobility Management Entity (MME), an Access Mobility Management Function (AMF) component, and/or the like), residing in the core network, to authenticate and/or authorize a communications session request from the UE, to register the UE with a mobile network (e.g., a network including the RAN and the core network), and/or the like. The unified RAN/MEC platform can, additionally, or alternatively, communicate with a user data management function component (e.g., a Home Subscriber Service entity, a Unified Data Management function component, and/or the like) residing in the core network, to obtain service agreement credentials, user identifier handling information, access authorization information, subscription management information, policy information, and/or the like, from the core network. In this way, the UE can establish a communications session with the unified RAN/MEC platform, or a mobile network including the unified RAN/MEC platform, and obtain services provided by the mobile network, which satisfy a service level agreement with a mobile network provider, using information obtained from the RAN and/or the core network.

In some implementations, the UE can obtain data by way of the unified RAN/MEC platform, upon establishing the communications session with the unified RAN/MEC platform, or the mobile network including the unified RAN/ MEC platform, and obtaining information from the core network. In some implementations, the UE can access data from content servers provided by the unified RAN/MEC platform, using application identifiers obtained from the core network. The application identifiers can identify and/or be associated with low-latency applications accessible to the UE and include and/or be associated with latency requirements (e.g., a minimum latency value or range associated with an application, a specified latency value or range associated with an application, and/or the like). As described herein, the unified RAN/MEC platform can determine, establish, classify, and/or identify low-latency bearers used for communicating data, between the UE and low-latency applications assessible to the UE, based on the latency requirements associated with application identifiers. For example, the unified RAN/MEC platform can compare information associated with a packet flow for packets received from the UE and the application identifiers, determine that the packets are destined for a low-latency application associated with an application identifier, and map the packet flow to a low-latency bearer configured to transport data between the UE and the unified RAN/MEC platform, according to the latency requirement associated with the application identifier.

In this way, the unified RAN/MEC platform can provide bearer-level isolation, bifurcation, and/or filtering of packets, to allow low-latency data to be served locally, by the unified RAN/MEC platform, from the edge of the RAN. In this way, other data (e.g., data not associated with low-latency requirements or specifications) can be served by the core network. In this way, low-latency data can be transmitted by way of dedicated, low-latency bearers established between the UE and the unified RAN/MEC platform, to satisfy and/or adhere to latency requirements specified for one or more application identifiers. In some implementations, the UE can obtain data from a content server that is co-located with the unified RAN/MEC platform, without having to signal across backhaul portions of the core network. In this way, the amount of latency associated with communicating data, one-way and/or end-to-end, between the UE and the content server co-located with the unified RAN/MEC platform, can be reduced.

In some implementations, the unified RAN/MEC platform can host low-latency applications (e.g., applications associated with required low-latency values and/or specified low-latency ranges) by way of local content servers (e.g., content servers co-located with the unified RAN/MEC platform). Additionally, or, alternatively, the unified RAN/MEC platform can access low-latency applications, and/or obtain data from low-latency applications, by way of the cloud, API calls, and/or the like. For example, the unified RAN/MEC can access cloud-based content servers by way of virtualized machines associated with the unified RAN/MEC. In this way, the UE can access data, in real-time, or near real-time, provided by the edge of the RAN. In this way, ultra-reliable, low-latency applications can be served, to the UE, by the unified RAN/MEC platform, for example, to facilitate intelligent transportation (e.g., self-driving vehicles), drone control, robotic surgeries, artificial intelligence (AI), and/or the like.

To illustrate the above, and turning to FIG. 1A, the UE can request a communication session, as shown by reference number 102. In some implementations, the UE can request the establishment of a mobile communication session with a mobile network, which includes the RAN, the unified RAN/ MEC platform located at the edge of the RAN, and/or the core network. The UE can send the request to the base station of the RAN, which can include an access point of the RAN, such as a 5G next generation NodeB (gNodeB or gNB), a LTE evolved NodeB (eNodeB or eNB), and/or the like. The UE can include a communication and/or computing device, such as a mobile phone, a smartphone, a laptop computer, a tablet computer, an Internet of Things (IoT) device, an unmanned vehicle (UV), a manned vehicle, a robot, and/or the like.

As further shown in FIG. 1A, and by reference number 104, the RAN can process the request, and initiate establishment of the communication session. In some implementations, the base station can process the request by establishing communication with the core network, to authorize and authenticate the communications session with the mobile network.

The core network can include a 5G next generation core network (NG Core), a LTE evolved packet core (EPC), and/or the like. The core network can include a user data management function component (e.g., a UDM, a HSS, and/or the like), an access and mobility management function component (e.g., a MME, a AMF, and/or the like), and/or the like, by which the communications session can be established.

As further shown in FIG. 1A, and by reference number 106, the access and mobility management function component can perform session management and connection tasks to authenticate and/or authorize the communications session requested by the UE. For example, the access and mobility management function component can obtain connection, mobility, and/or session related information, from the UE (e.g., directly or by way of the base station), for allowing the UE to access services from the network during the communications session.

As further shown in FIG. 1A, and by reference number 108, the user data management function component can obtain subscription data associated with the UE, and report the subscription data to the RAN, for registering the UE with the mobile network. For example, the user data management function component can access subscription data to generate authentication credentials, generate user identification handling identifiers (e.g., subscription identifiers), and/or the like, by which the communications session can be provided, implemented, or otherwise established between the UE and the mobile network.

As further shown in FIG. 1A, and by reference number 110, the communication session can be established between the UE and the mobile network, including the RAN, unified RAN/MEC platform, and/or core network, upon attaching to the RAN, the unified RAN/MEC platform, and/or the core network.

Figure 1B:
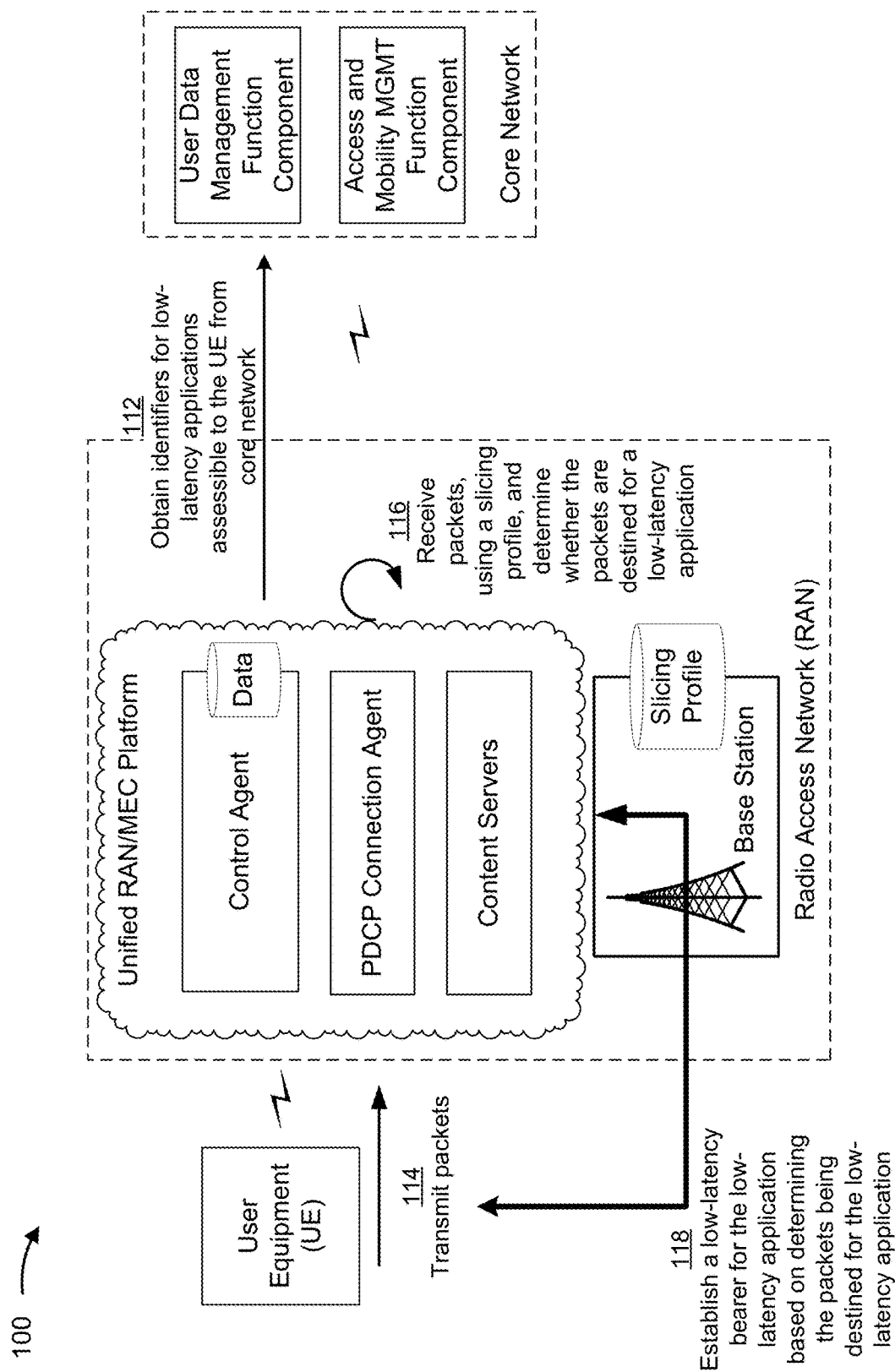

Turning to FIG. 1B, and by reference number 112, the unified RAN/MEC platform can obtain information from the core network. In some implementations, the control agent co-located with the unified RAN/MEC platform can obtain information from the core network. Such information can include, for example, application identifiers associated with applications accessible to the UE. For example, the unified RAN/MEC platform can obtain IP addresses, or other identifiers, associated with applications accessible to the UE. In some implementations, the application identifiers are associated with low-latency applications, having latency requirements. The latency requirements can include, for example, low-latency values or ranges associated with a one-way trip (e.g., from the UE to the unified RAN/MEC platform, and/or the like) signaling of packets from the UE to an entity hosting the application identifier, a round-trip (e.g., end-to-end between the UE and the unified RAN/MEC platform) signaling of packets between the UE and the entity hosting an application identified by an application identifier, and/or the like. The low-latency values or ranges can indicate an amount of time in which to communicate one or more packets between the UE and the entity hosting an application identified by an application identifier. The entity hosting the application can be the unified RAN/MEC platform and/or a content server co-located with the unified RAN/MEC platform, in some implementations. In some implementations, the entity hosting the application can include a remote content server, assessible by the unified RAN/MEC platform, in real-time or near real-time, by way of the cloud, the Internet, an API call, and/or the like.

In some implementations, the low-latency requirements associated with low-latency applications can include, for example, a round-trip latency range of less than about 15 ms. In some implementations, the low-latency requirements associated with low-latency applications can include, for example, a one-way trip latency range of less than about 5 ms. Any value or range, not inconsistent with the instant disclosure, can be associated with a low-latency application as described herein.

In some implementations, a network provider or operator can provision the information (e.g., the application identifiers, latency requirements, and/or the like) to the core network. In some implementations, the core network can automatically transmit, signal, stream, or forward the information to the unified RAN/MEC platform. In this way, latency associated with signaling data between the UE and the unified RAN/MEC platform, to obtain such information, can further be reduced. Additionally, or alternatively, the unified RAN/MEC platform can subscribe to receive the information from the core network, access the information using an API interface or call, and/or the like.

As further shown in FIG. 1B, and by reference number 114, the UE can transmit packets towards the RAN. The packets can be destined for a content server by which the UE can be provided access to an application, for obtaining data and/or implementing a task, such as an automated task, a self-driving task, a self-controlling task, a surgical task, an AI task, and/or the like. The packets can include data associated with one or more packet flows, such as 5-tuple data or information.

As further shown in FIG. 1A, and by reference number 116, the unified RAN/MEC platform can receive the packets, transmitted by the UE, by way of a slicing profile provided at the base station, and determine whether the packets are destined for a low-latency application. In some implementations, the slicing profile is provided by a RLC layer of the base station. The slicing profile can include a mapping between one or more packet flows associated with packets obtained from the UE, and the unified RAN/MEC platform. In this way, the packets can be routed more efficiently through the RAN and obviate routing or storage components associated with the core network. In some implementations, the PDCP connection agent includes a user plane that is virtualized for co-location with the unified RAN/MEC platform. In this way, the unified RAN/MEC platform can comprise virtualized RAN resources at the unified RAN/MEC platform, so that networking, storage, and compute resources can be allocated to implement RAN, core network, and/or application functionality, at the edge of the RAN network, and/or can be provided in a flexible manner, as opposed to relying on dedicated hardware and software to implement these functions. In some implementations, the slicing profile can include a mapping between specific packet flows associated with the packets and the PDCP connection agent co-located with the unified RAN/MEC platform. The specific packet flows can be associated with a low-latency bearer, an application identifier, and/or the like. In some implementations, every packet flow associated with a specific UE can be mapped to the PDCP connection agent.

In some implementations, the PDCP connection agent can determine whether the packets are destined for a low-latency application. For example, the PDCP connection agent can compare information associated with the packet flow, obtained from the base station, and the application identifiers, obtained from the core network. As an example, the PDCP connection agent can examine a packet flow associated with a packet received from the UE, examine a destination IP address associated with the packet flow, and compare the destination IP address with an application identifier obtained from the core network. The PDCP connection agent can determine that the packet is destined for a low-latency application where the destination IP address included in the packet flow matches an application identifier. Additionally, or, alternatively, the PDCP connection agent can examine the latency value or range associated with the application identifier included in the packet flow to determine whether the packet is destined for a low-latency application. For example, where the latency value or range satisfies a threshold (e.g., a threshold value or range), the PDCP connection agent can determine that the traffic is destined for a low-latency application. In this way, the PDCP connection agent can bifurcate the processing of traffic between the unified RAN/MEC platform and the core network, to ensure that low-latency data is processed and/or served by the unified RAN/MEC platform, located at the edge of the RAN. Other traffic can be processed by and/or served by the core network. In this way, signaling between the RAN and the core network can be optimized, improved, and/or made more efficient. In this way, the PDCP connection agent can establish, identify, and/or classify low-latency bearers, to provide bearer level processing by the unified RAN/MEC platform.

As further shown in FIG. 1A, and by reference number 118, a low-latency bearer can be identified and/or established between the UE and the unified RAN/MEC platform. Packets destined for one or more low-latency applications can be transported by the low-latency bearer established between the UE and the unified RAN/MEC platform. In some implementations, a single low-latency bearer can extend between the UE, the base station, and the unified RAN/MEC, for facilitating end-to-end signaling of data between a specific UE and the unified RAN/MEC platform. In this way, data from multiple low-latency applications can be transported to the specific UE from the edge of the RAN, for reduced latencies. In some implementations, multiple low-latency bearers can extend between the specific UE, the base station, and the unified RAN/MEC, for facilitating end-to-end signaling of data between the specific UE and multiple content servers provided by the unified RAN/MEC platform. In this way, obtaining data from and/or exchanging data with low-latency applications can be flexible, scalable, and/or more automated and efficient, which optimizes the use of RAN resources, including resources associated with the unified RAN/MEC platform, in real-time.

Figure 1C:
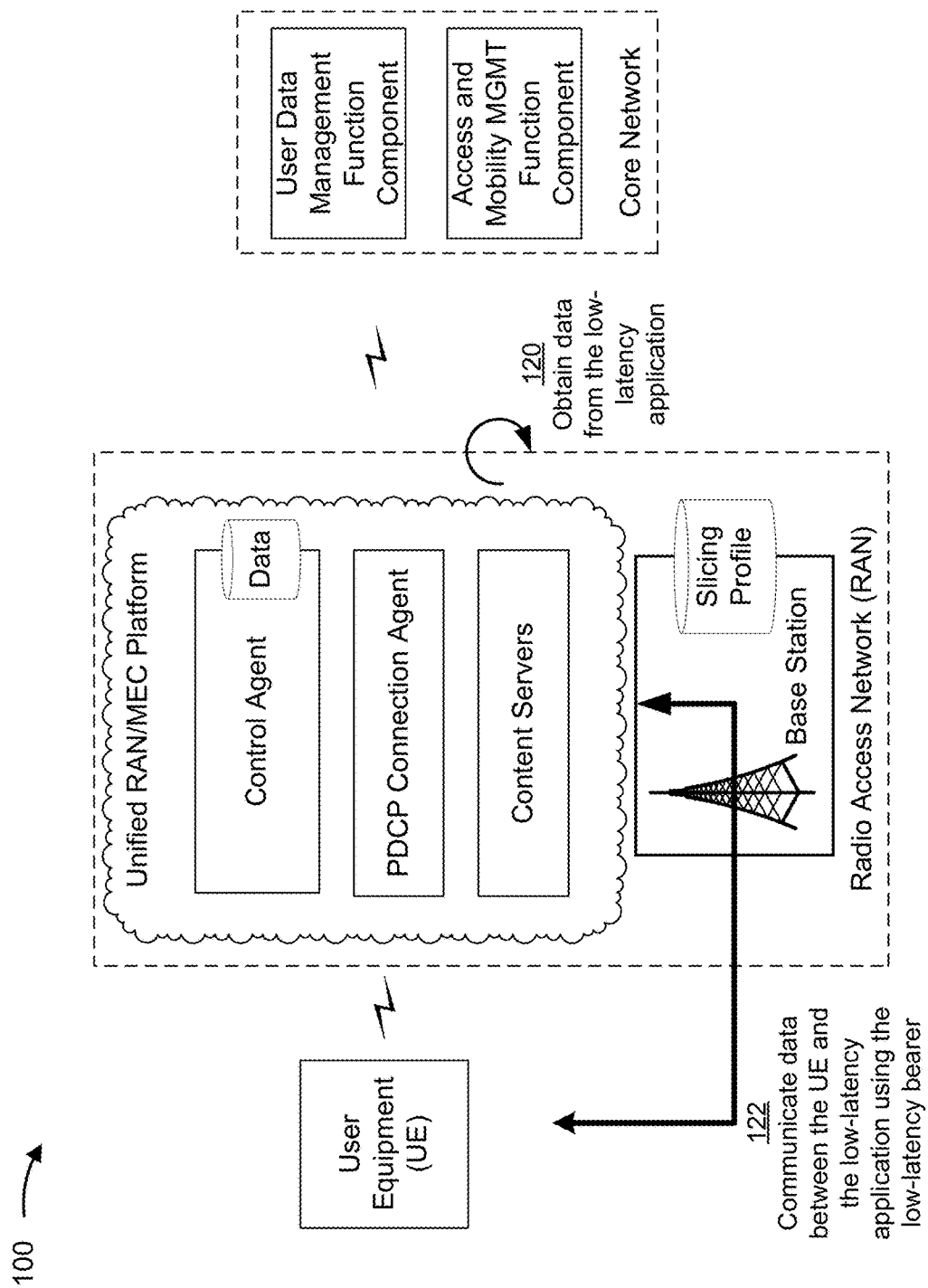

Turning to FIG. 1C, and by reference number 120, the unified RAN/MEC platform can obtain data from a low-latency application for transmission to the UE by way of the low-latency bearer. In some implementations, the unified RAN/MEC platform can obtain data from the low-latency application hosted by a content server co-located with the unified RAN/MEC platform. In some implementations, the unified RAN/MEC platform can obtain data from the low-latency application by way of a cloud computing resource associated with the unified RAN/MEC platform. In some implementations, the unified RAN/MEC platform can access low-latency application data from a content server accessed using an API call. Other methods of obtaining data from low-latency applications, by the unified RAN/MEC platform, are contemplated.

As further shown in FIG. 1C, and by reference number 122, the unified RAN/MEC platform and the UE can communicate data, from the low-latency application, using the low-latency bearer identified by the PDCP connection agent. In some implementations, the data can be transported by way of signaling using the low-latency bearer. The one-way and/or round-trip latency associated with signaling data between the UE and the unified RAN/MEC platform can be reduced, by virtue of locating the unified RAN/MEC platform at the edge of the RAN. In this way, the UE can run, or execute, applications that satisfy specified, low-latency ranges. The low-latency values or ranges can be less than 10 ms, in some implementations, allowing the UE to perform tasks that require low-latency, such as intelligence driven tasks (e.g., intelligent driving, intelligent robotic tasks), UV control, and/or the like Turning to FIG. 1D, and by reference number 124, a first low-latency bearer can be established between a first UE and the unified RAN/MEC platform. In some implementations, the first low-latency bearer can be established between the first UE, the base station, and the unified RAN/MEC platform, as described above. In some implementations, the PDCP connection agent can establish the first low-latency bearer, based on obtaining application identifiers and/or latency requirements associated with low-latency applications assessible to the UE, determining that one or more packets are destined for a low-latency application associated with an application identifier, and mapping a packet flow associated with the one or more packets to the first low-latency bearer. The first low-latency bearer can satisfy the specified latency requirements associated with the low-latency application having the application identifier, as described above.

Figure 1D:
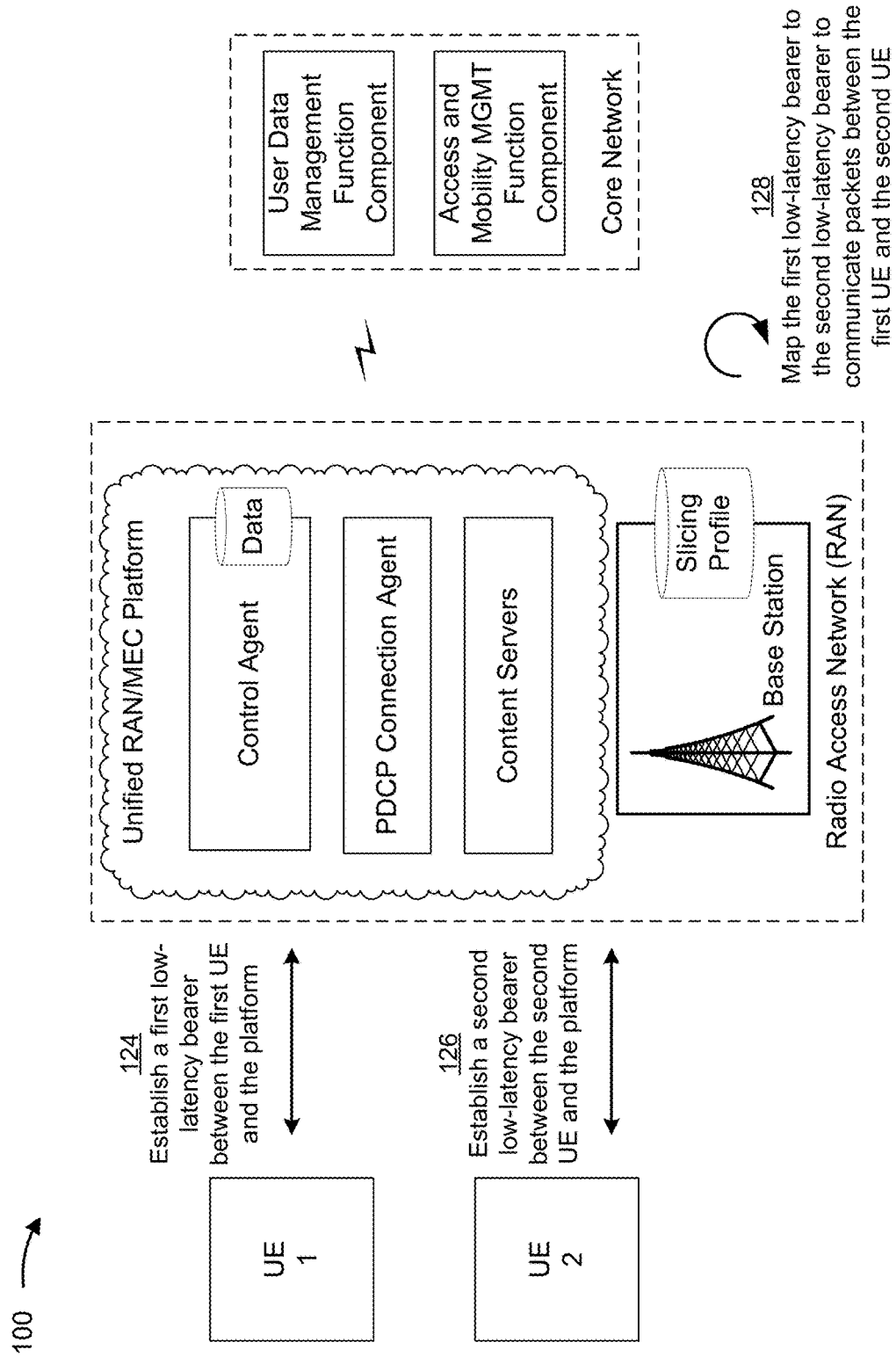

As further shown in FIG. 1D, and by reference number 126, a second low-latency bearer can be established between a second UE and the unified RAN/MEC platform. In some implementations, the second low-latency bearer can be established between the second UE, the base station, and the unified RAN/MEC platform, as described above. In this way, multiple UEs can connect to the unified RAN/MEC platform by way of one or more dedicated and/or default low-latency bearers, for receiving low-latency application data from the unified RAN/MEC platform, while bypassing the core network.

As further shown in FIG. 1D, and by reference number 128, the unified RAN/MEC platform can map the first low-latency bearer to the second low-latency bearer. In some implementations, the PDCP connection agent is configured to map the first bearer to the second bearer, based a mapping of the first UE and the second UE to a same (e.g., shared) application identifier. In this way, the signaling or communication of data between multiple UEs can be facilitated by the unified RAN/MEC platform. In this way, low-latency gaming applications, vehicle-to-vehicle applications, and/or the like, can be implemented by the unified RAN/MEC platform.

In this way, the unified RAN/MEC platform can provide bearer-level isolation, bifurcation, and/or filtering of packets, to allow low-latency data to be served locally, by the unified RAN/MEC platform, from the edge of the RAN. In this way, other data (e.g., data not associated with low-latency requirements or specifications) can be served by the core network. In this way, low-latency data can be transmitted by way of dedicated, low-latency bearers established between the UE and the unified RAN/MEC platform, to satisfy and/or adhere to latency requirements specified for one or more application identifiers. In some implementations, the UE can obtain data from content servers that are co-located with the unified RAN/MEC platform, without having to signal across backhaul portions of the core network. In this way, the amount of latency associated with communicating data, one-way and/or end-to-end, between the UE and the content server co-located with the unified RAN/MEC platform, can be reduced.

As indicated above, FIGS. 1A-1D are provided merely as an example. Other examples are possible and can differ from what was described with regard to FIGS. 1A-1D.

Figure 2:
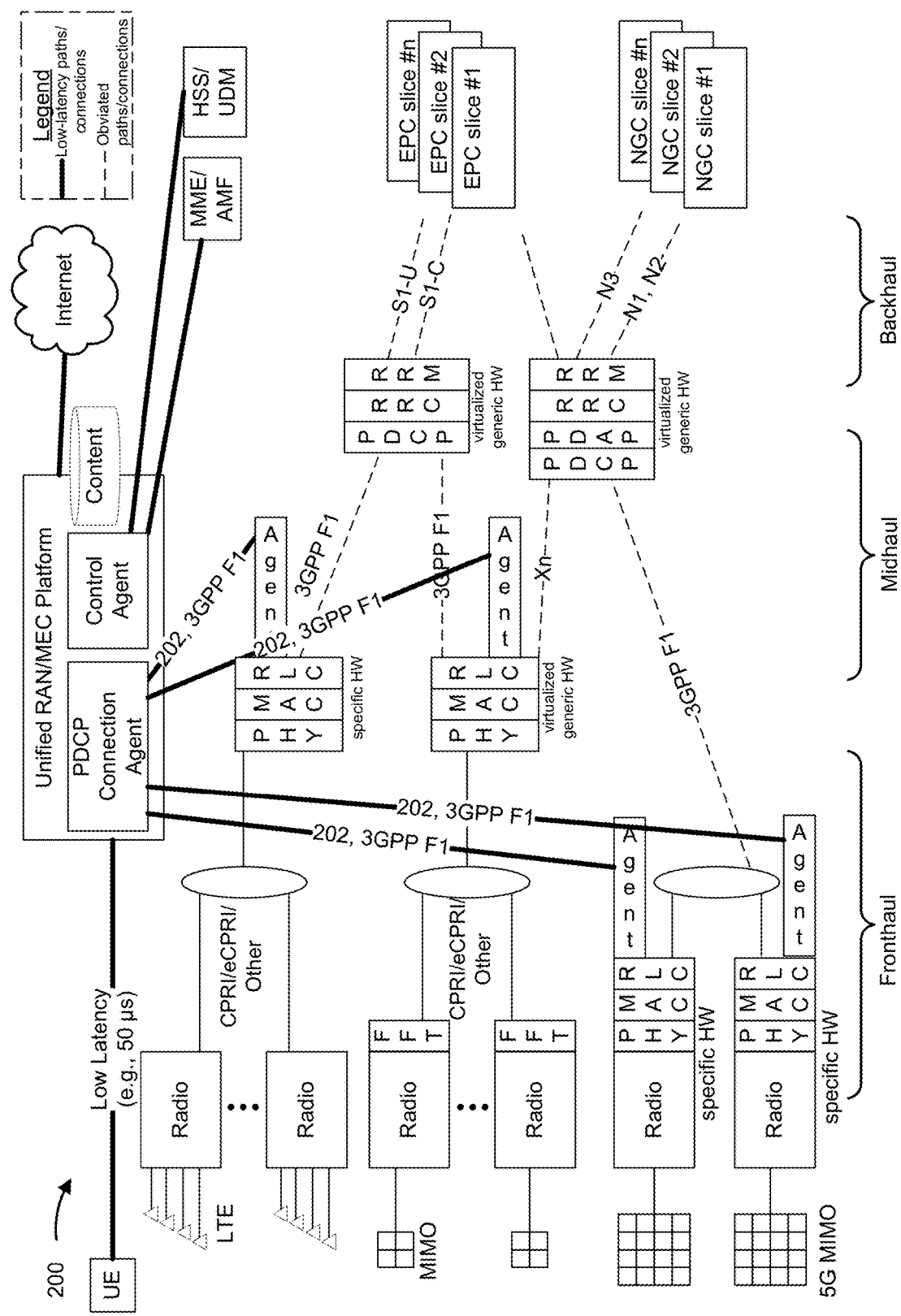
FIG. 2 is a diagram of an example environment in which devices, systems, and/or methods, described herein, can be implemented.

FIG. 2 is a diagram of an example environment 200 described herein, in which devices, systems and/or methods can be implemented. FIG. 2 provides a detailed view of example environment 200, identifying multiple low-latency bearers 202 established between RLC layers of radio nodes (e.g., base stations), and the PDCP connection agent of the unified RAN/MEC platform. In some implementations, the PDCP connection agent, co-located with the unified RAN/MEC platform, can include a virtualized user data plane, facilitated by way of splitting the user plane sub-layer and the control plane sub-layer of radio stacks in the radio. In this way, the PDCP connection agent can receive user-plane packets from the RLC layers of the radio nodes and bifurcate the processing of the packets based on determining that the bearer path is a low-latency bearer path. Stated differently, packets destined for low-latency applications and/or low-latency bearers can be isolated, by the PDCP connection agent, so that the packets can be sent to the unified RAN/MEC platform instead of the core network.

In some implementations, the PDCP connection agent can identify the low-latency bearers by comparing application identifiers, obtained by the control agent, and destination identifiers, obtained by the PDCP connection agent. The destination identifiers can be associated with packet flows of packets obtained by the PDCP connection agent, as described above. In some implementations, the PDCP connection agent can identify low-latency bearers based on obtaining latency requirements associated with the packets mapped by the RLC layer and/or obtaining latency requirements associated the application identifiers obtained, from core network entities (e.g., MME, AMF, etc.), by the control agent. In some implementations, the RLC layer can map specific flows to the PDCP connection agent. In some implementations, the PDCP connection agent can include a LTE PDCP connection agent, a new radio (NR) PDCP connection agent, and/or the like. The connection between the RLC layer and the PDCP connection agent can be established using an F1 interface (e.g., a 3GPP F1 interface).

As further shown in FIG. 2, the low-latency bearers 202 identified, by the PDCP connection agent, between the UE, the radio node, and the unified RAN/MEC platform can transport packets, one-way, at a rate of, for example, about 50 is. In this way, the round-trip latency associated with transporting packets between the UE and the unified RAN/MEC platform can be less than about 10 ms, and/or the like. In this way, signaling across the core network, or portions of the core network, can be obviated.

As further shown in FIG. 2, in some implementations, the control agent obtains data from one or more core network entities (e.g., MME, AMF, UDM, etc.). The information can include application identifiers, session information, policy information, subscriber information, and/or the like, as described above.

As further shown by FIG. 2, in some implementations, data paths, bearers, connections, and/or resources associated with the core network can be obviated. For example, and, as shown by the dashed lines in FIG. 2, resources associated with the midhaul and/or backhaul portions of the core network can be obviated. In this way, computing and storage resources associated with the core network can be conserved, and/or optimized. In this way, the unified RAN/MEC platform facilitates efficient, optimized delivery of low-latency application data, or content, from the unified RAN/MEC platform, so that delivery of such content using core network resources can be bypassed, obviated, and/or otherwise conserved.

As indicated above, FIG. 2 is provided merely as an example. Other examples are possible and can differ from what was described with regard to FIG. 2. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
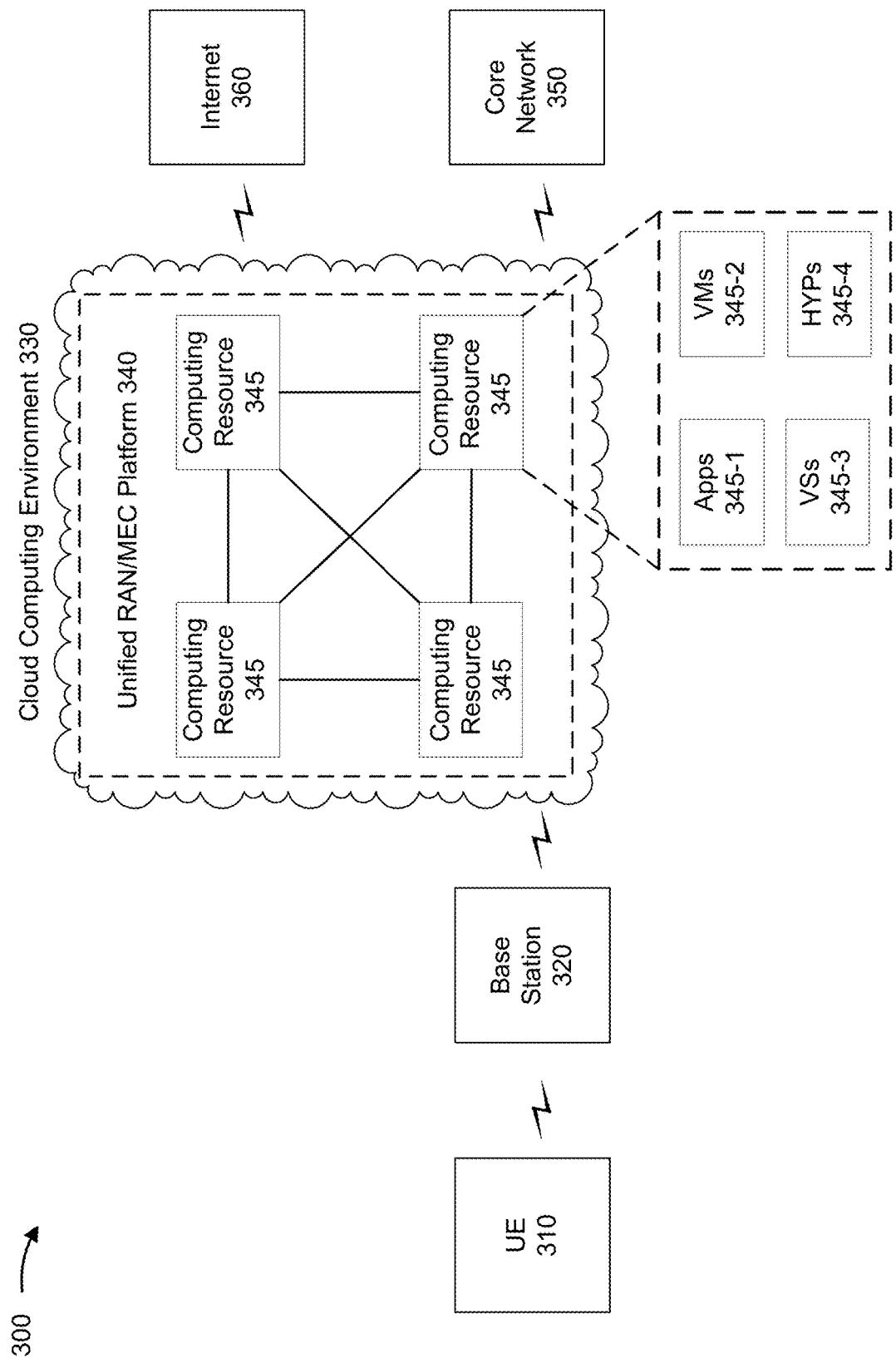
FIG. 3 is a diagram of another example environment in which the devices, systems, and/or methods, described herein, can be implemented.

FIG. 3 is a diagram of another example environment 300 in which devices, systems and/or methods, described herein, can be implemented. As shown in FIG. 3, environment 300 can include a UE 310, a base station 320, a cloud computing environment 330, a unified RAN/MEC platform 340, a computing resource 345, and a core network 350. Devices of environment 300 can interconnect via wired connections, wireless connections, or a combination of wired and wireless connections.

UE 310 can include one or more user devices capable of communicating with base station 320 and/or a network (e.g., a radio access network, a core network, the Internet, etc.). For example, UE 310 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, a UAV (e.g., a drone), a vehicle (e.g., a car including wireless connectivity, a truck including wireless connectivity, and/or the like), and/or a similar device. UE 310 can be capable of communicating using uplink communications (e.g., UE to base station), downlink communications (e.g., base station to UE), and/or sidelink (e.g., UE-to-UE) communications. In some implementations, UE 310 can include a machine-type communication (MTC) UE, such as an evolved or enhanced MTC (eMTC) UE. In some implementations, UE 310 can include an Internet of Things (IoT) UE, such as a narrowband IoT (NB-IoT) UE and/or the like.

Base station 320 can include one or more devices capable of communicating with UE 310 using cellular radio access technology. For example, base station 320 can include a base transceiver station, a radio base station, a node B, an evolved node B (eNB), a base station subsystem, a cellular site, a cellular tower (e.g., a cell phone tower, a mobile phone tower, etc.), a radio access node, a macrocell base station, a microcell base station, a picocell base station, a femtocell base station, or a similar type of device. Base station 320 can transfer data between UE 310 and unified RAN/MEC platform 340, which can include a cloud-based platform. In some implementations, base station 320 can communicate with UE 310, unified RAN/MEC platform 340, and/or the like, using radio waves.

Cloud computing environment 330 includes an environment that delivers computing as a service, whereby shared resources, services, content, and/or the like, can be provided to unified RAN/MEC platform 340 for facilitating the exchange of data by way of a low-latency bearer between UE 310 and unified RAN/MEC platform 340. Cloud computing environment 330 can provide computation, software, data access, storage, and/or other services that do not require end-user knowledge of a physical location and configuration of a system and/or a device that delivers the services. As shown, cloud computing environment 330 can include unified RAN/MEC platform 340 and computing resources 345.

Unified RAN/MEC platform 340 can include one or more devices capable of sending, receiving, generating, storing, processing, and/or providing low-latency communications between a content server (e.g., an application server) and UE 310. For example, unified RAN/MEC platform 340 can include a platform implemented by cloud computing environment 330 that can generate, send, receive, and/or process data from one UE 310 and/or between multiple UEs at less than 10 ms. In some implementations, unified RAN/MEC platform 340 is implemented by computing resources 345 of cloud computing environment 330.

While the example environment 300 indicates that unified RAN/MEC platform 340 is implemented in cloud computing environment 330, in some implementations, unified RAN/MEC platform 340 can be implemented by one or more other types of devices as well, such as a server, a computer, and/or the like.

Computing resource 345 can include one or more personal computers, workstation computers, server devices, or another type of computation and/or communication device. In some implementations, computing resource 345 can comprise cloud computing resources configured to host unified RAN/MEC platform 340 and/or content servers associated with unified RAN/MEC platform 340. The cloud resources can include compute instances executing in computing resource 345, storage devices provided in computing resource 345, data transfer devices provided by computing resource 345, etc. In some implementations, computing resource 345 can communicate with other computing resources 345 via wired connections, wireless connections, or a combination of wired and wireless connections.

As further shown in FIG. 3, computing resource 345 can include a group of cloud resources, such as one or more applications ("APPs") 345-1, one or more virtual machines ("VMs") 345-2, virtualized storage ("VSs") 345-3, one or more hypervisors ("HYPs") 345-4, or the like.

Application 345-1 can include one or more software applications that can be provided to or accessed by UE 310. Application 345-1 can eliminate a need to install and execute the software applications on UE 310. For example, application 345-1 can include software associated with unified RAN/MEC platform 340, and/or any other software capable of being provided via cloud computing environment 330. In some implementations, one application 345-1 can send/receive information to/from one or more other applications 345-1, via virtual machine 345-2.

Virtual machine 345-2 can include a software implementation of a machine (e.g., a computer) that executes programs like a physical machine. Virtual machine 345-2 can be a system virtual machine or a process virtual machine, depending upon use and degree of correspondence to any real machine by virtual machine 345-2. A system virtual machine can provide a complete system platform that supports execution of a complete operating system ("OS"). A process virtual machine can execute a single program and can support a single process. In some implementations, virtual machine 345-2 can execute on behalf of a user (e.g., UE 310, unified RAN/MEC platform 340, and/or the like), and can manage infrastructure of cloud computing environment 330, such as data management, synchronization, or long-duration data transfers.

Virtualized storage 345-3 includes one or more storage systems and/or one or more devices that use virtualization techniques within the storage systems or devices of computing resource 345. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 345-4 provides hardware virtualization techniques that allow multiple operating systems (e.g., "guest operating systems") to execute concurrently on a host computer, such as computing resource 345. Hypervisor 345-4 can present a virtual operating platform to the guest operating systems and can manage the execution of the guest operating systems. Multiple instances of a variety of operating systems can share virtualized hardware resources.

Core Network 350 can include various types of core network architectures, such as a 5G NG Core, a LTE EPC, and/or the like, by which UE 310 can attach, connect, and/or otherwise establish a communications session with unified RAN/MEC platform 340. In some implementations, core network 350 can be implemented on physical devices, such as a gateway, a MME, and/or the like. In some implementations, the hardware and/or software implementing core network 350 can be virtualized (e.g., through the use of network function virtualization and/or software-defined networking), thereby allowing for the use of composable infrastructure when implementing core network 350.

Unified RAN/MEC platform 340 can be connected to the Internet 360 for facilitating content delivery to UE 310. The Internet 360 can include one or more data networks, such as an IP Multimedia Subsystem (IMS), a public land mobile network (PLMN), a local area network (LAN), a wide area network (WAN), a metropolitan area network (MAN), a private network (e.g., a corporate intranet), an ad hoc network, a fiber optic-based network, a cloud computing network, a third party services network, an operator services network, and/or the like, and/or a combination of these or other types of networks. Unified RAN/MEC platform 340 can obtain data or content from Internet 360, and deliver it to UE 310, while bypassing core network 350.

The number and arrangement of devices and networks shown in FIG. 3 are provided as an example. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of environment 300 can perform one or more functions described as being performed by another set of devices of environment 300.

Figure 4:
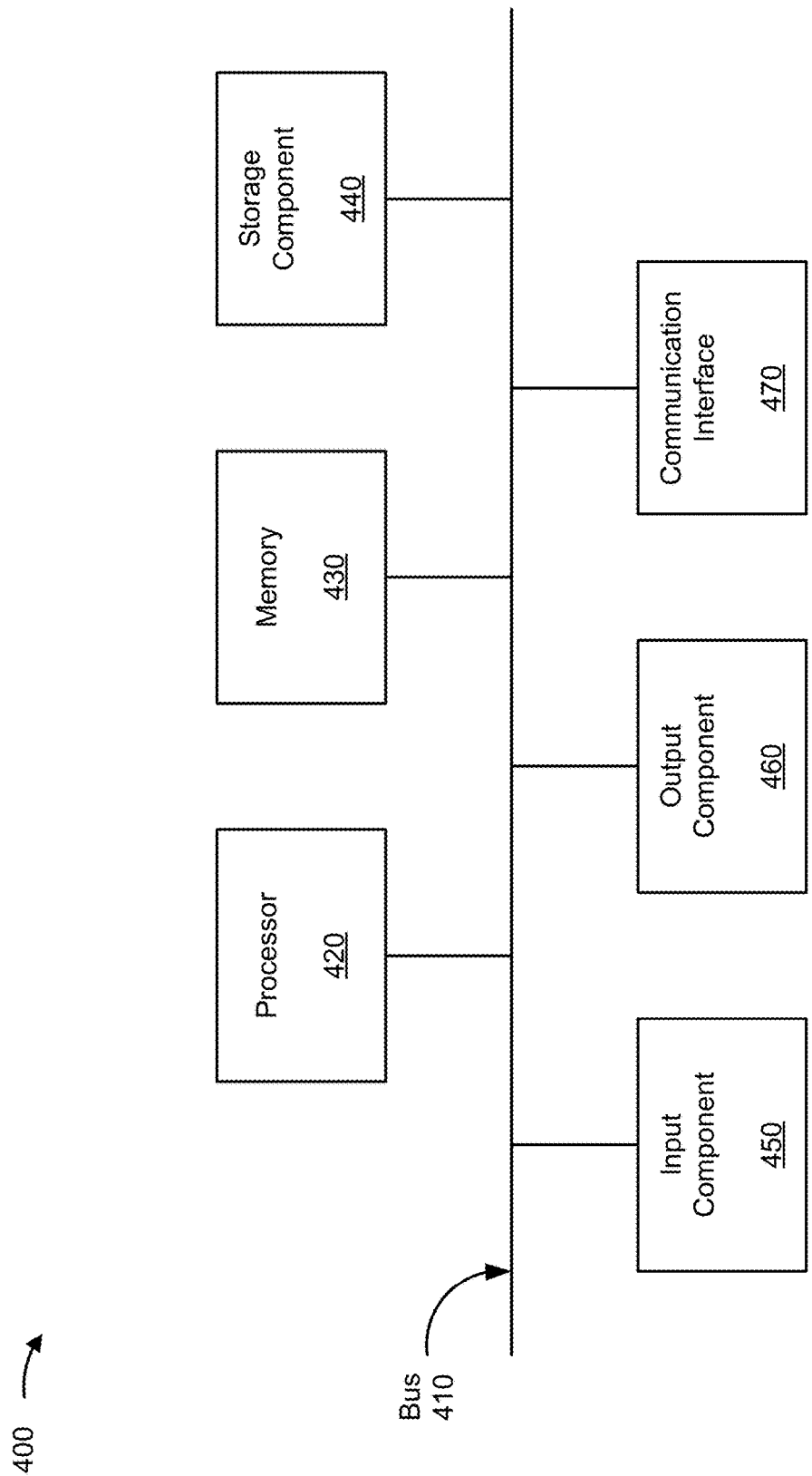
FIG. 4 is a diagram of example components of one or more devices of FIG. 3.

FIG. 4 is a diagram of example components of a device 400. Device 400 can correspond UE 310, base station 320, unified RAN/MEC platform 340, computing resource 345 of unified RAN/MEC platform 340, and/or the like. In some implementations, UE 310, base station 320, unified RAN/MEC platform 340, and/or computing resource 345 of unified RAN/MEC platform 340 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 can include a component that permits communication among the components of device 400. Processor 420 can be implemented in hardware, firmware, or a combination of hardware and software. Processor 420 can include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 can store information and/or software related to the operation and use of device 400. For example, storage component 440 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 can include a component that permits device 400 to receive information, such as via user input (e.g., a touch screen display, a keyboard, a keypad, a mouse, a button, a switch, and/or a microphone) or interface. Additionally, or alternatively, input component 450 can include a sensor for sensing information (e.g., a global positioning system (GPS) component, an accelerometer, a gyroscope, and/or an actuator). Output component 460 can include a component that provides output information from device 400 (e.g., a display, a speaker, an interface, and/or one or more light-emitting diodes (LEDs)).

Communication interface 470 can include a transceiver-like component (e.g., a transceiver and/or a separate receiver and transmitter) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, or the like.

Device 400 can perform one or more processes described herein. Device 400 can perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5:
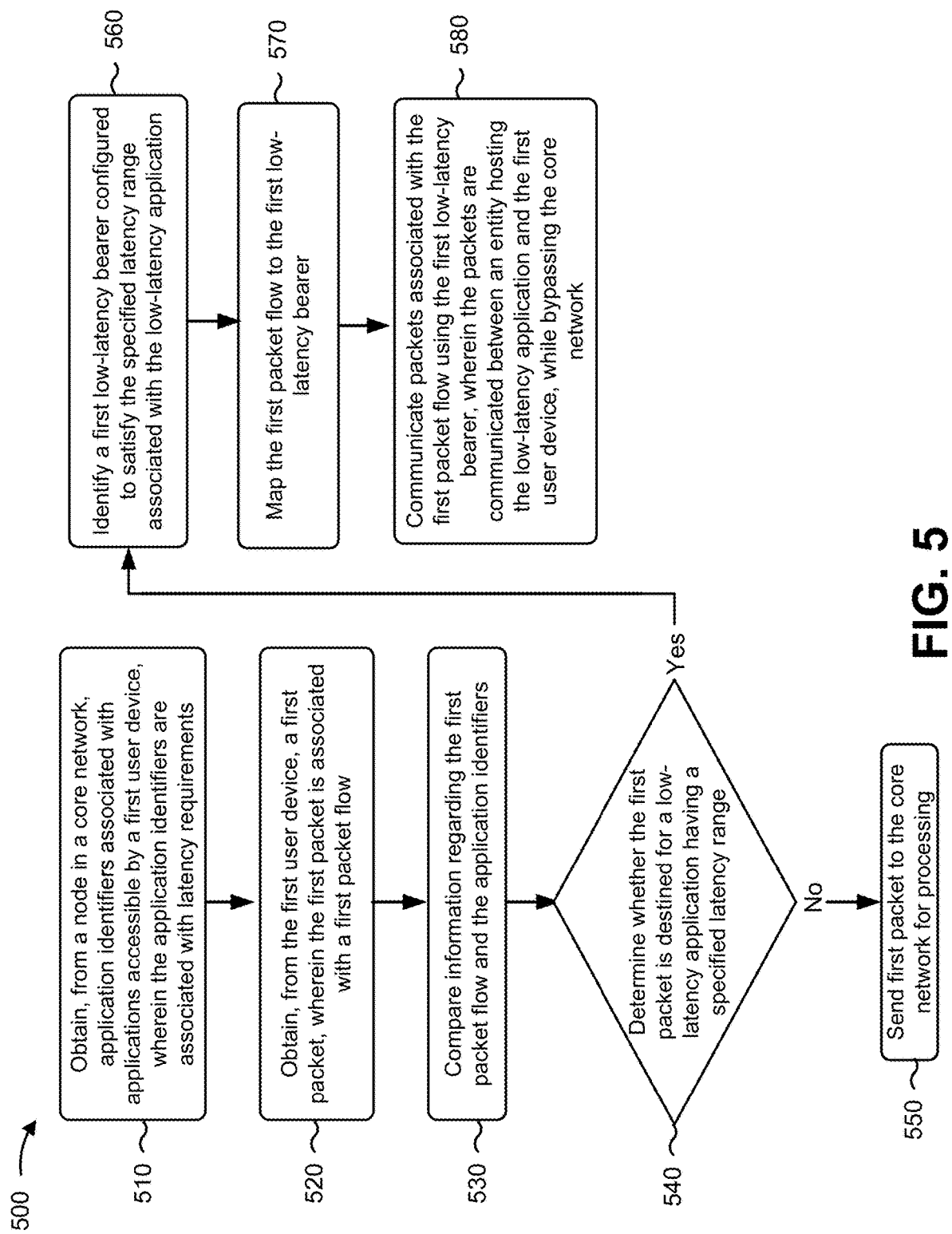
FIG. 5 is a flow chart of an example process for processing data packets destined for a low-latency application.

FIG. 5 is a flow chart of an example process 500 for processing data packets destined for a low-latency application. In some implementations, one or more process blocks of FIG. 5 can be performed by a unified RAN/MEC platform (e.g., unified RAN/MEC platform 340), or a cloud computing resource associated with the unified RAN/MEC platform (e.g., computing resource 345). In some implementations, one or more process blocks of FIG. 5 can be performed by another device, or a group of devices, separate from or including the unified RAN/MEC platform (e.g., unified RAN/MEC platform 340), such as a UE (e.g., UE 310), a base station (e.g., base station 320), or a device in a core network (e.g., core network 350).

As shown in FIG. 5, process 500 can include obtaining, from a node in the core network, application identifiers associated with applications accessible by a first user device (block 510). For example, the unified RAN/MEC platform (e.g., using computing resource 345, processor 420, memory 430, storage component 440, input component 450, communication interface 470, and/or the like) can obtain, from a node in the core network, application identifiers associated with applications accessible by a first user device, as described above in connection with FIGS. 1A-1D. In some implementations, the application identifiers are associated with latency requirements.

As shown in FIG. 5, process 500 can include obtaining, from the first user device, a first packet (block 520). For example, the unified RAN/MEC platform (e.g., using computing resource 345, processor 420, memory 430, storage component 440, input component 450, communication interface 470, and/or the like) can obtain, from the first user device, the first packet, as described above in connection with FIGS. 1A-1D. In some implementations, the first packet is associated with a first packet flow.

As shown in FIG. 5, process 500 can include comparing information regarding the first packet flow and the application identifiers (block 530). For example, the unified RAN/MEC platform (e.g., using computing resource 345, processor 420, memory 430, storage component 440, communication interface 470, and/or the like) can compare information regarding the first packet flow and the application identifiers, as described above in connection with FIGS. 1A-1D.

As shown in FIG. 5, process 500 can include determining whether the first packet is destined for a low-latency application having a specified latency range based on a first result of comparing the first packet flow and the application identifiers (block 540). For example, the unified RAN/MEC platform (e.g., using computing resource 345, processor 420, memory 430, storage component 440, communication interface 470, and/or the like) can determine whether the first packet is destined for a low-latency application having a specified latency range, as described above in connection with FIGS. 1A-1D.

As shown in FIG. 5, process 500 can include sending the first packet to the core network for processing based on determining that the first packet is not destined for a low-latency application (block 550). For example, the unified RAN/MEC platform (e.g., using computing resource 345, processor 420, memory 430, storage component 440, communication interface 470, and/or the like) can send the first packet to the core network for processing based on determining that the first packet is not destined for a low-latency application, as described above in connection with FIGS. 1A-1D.

As shown in FIG. 5, process 500 can include identifying a first low-latency bearer configured to satisfy the specified latency range associated with the low-latency application (block 560). For example, the unified RAN/MEC platform (e.g., using computing resource 345, processor 420, memory 430, storage component 440, communication interface 470, and/or the like) can identify a first low-latency bearer configured to satisfy the specified latency range associated with the low-latency application, as described above in connection with FIGS. 1A-1D.

As shown in FIG. 5, process 500 can include mapping the first packet flow to the first low-latency bearer (block 570). For example, the unified RAN/MEC platform (e.g., using computing resource 345, processor 420, memory 430, storage component 440, communication interface 470, and/or the like) can map the first packet flow to the first low-latency bearer, as described above in connection with FIGS. 1A-1D.

As shown in FIG. 5, process 500 can include communicating packets associated with the first packet flow, using the first low-latency bearer (block 580). For example, the unified RAN/MEC platform (e.g., using computing resource 345, processor 420, memory 430, storage component 440, output component 460, communication interface 470, and/or the like) can communicate packets associated with the first packet flow, using the first low-latency bearer, as described above in connection with FIGS. 1A-1D. In some implementations, the packets are communicated using the low-latency bearer while bypassing the core network.

Process 500 can include additional implementations, such as any single implementation or any combination of implementations described below and/or in connection with one or more other processes described elsewhere herein.

In some implementations, process 500 is performed by a device in the RAN. The device can be provided at the edge of the RAN, between the RAN and the core network, and/or the like. In some implementations, the entity hosting the low-latency application is the device performing process 500, or a cloud computing resource associated with the device performing process 500. In some implementations, a PDCP connection agent is configured to determine that the first packet is destined for a low-latency application in about 30 to 50 microseconds. In some implementations, the specified latency range is less than 10 ms.

In some implementations, process 500 can include obtaining, from a second user device, a second packet having a second packet flow, comparing information regarding the second packet flow and the application identifiers, determining that the second packet is destined for the low-latency application having the specified latency range based on a second result of comparing the information regarding the second packet flow and the application identifiers, identifying a second low-latency bearer configured to satisfy the specified latency range associated with the low-latency application, mapping the second packet flow to the second low-latency bearer, mapping the first low-latency bearer to the second low-latency bearer, and communicating a plurality of packets between the first user device and the second user device based on a mapping between the first low-latency bearer and the second low-latency bearer. In some implementations, the first user device and the second user device include one of a drone, a vehicle, a gaming device, a phone, and/or a computer.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

In this way, unified RAN/MEC platform 340 can provide bearer-level isolation, bifurcation, and/or filtering of packets, to allow low-latency data to be served locally, by unified RAN/MEC platform 340, from the edge of the RAN. In this way, data not associated with low-latency requirements or specifications can be served by core network 350. In this way, low-latency data can be transmitted by way of one or more low-latency bearers established between UE 310 and unified RAN/MEC platform 340, to satisfy and/or adhere to latency requirements specified for one or more application identifiers. In some implementations, UE 310 can obtain data from content servers (e.g., computing resources 345) that are co-located with the unified RAN/MEC platform, without having to signal across backhaul portions of core network 350. In this way, the amount of latency associated with communicating data, one-way and/or end-to-end, between UE 310 and content servers (e.g., computing resources 345) co-located with unified RAN/MEC platform 340, can be reduced.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that the devices, systems, and/or methods, described herein, can be implemented in different forms of hardware, firmware, or a combination of hardware and software. The actual specialized control hardware or software code used to implement these devices, systems, and/or methods is not limiting of the implementations. Thus, the operation and behavior of the devices, systems, and/or methods were described herein without reference to specific software code-it being understood that software and hardware can be designed to implement the devices, systems, and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
    obtaining, by a device and from a node in a core network, application identifiers associated with applications accessible by a first user device,
        wherein the application identifiers are associated with latency requirements;
    comparing, by the device, information regarding a first packet flow associated with the first user device and the application identifiers;
    determining, by the device, that a first packet associated with the first packet flow is destined for a low-latency application having a specified latency range based on comparing the information regarding the first packet flow and the application identifiers;
    identifying, by the device, a first low-latency bearer configured to satisfy the specified latency range associated with the low-latency application; and
    mapping, by the device, the first packet flow to the first low-latency bearer.

2. The method of claim 1, further comprising:
    communicating packets, associated with the first packet flow, using the first low-latency bearer,
        wherein the packets are communicated between an entity hosting the low-latency application and the first user device, while bypassing the core network.

3. The method of claim 2, wherein the device is provided at an edge of a radio access network (RAN).

4. The method of claim 1, wherein a Packet Data Convergence Protocol (PDCP) agent is configured to determine that the first packet is destined for the low-latency application.

5. The method of claim 4, wherein the PDCP agent is configured to obtain the first packet by way of a mapping table provided at a radio link control (RLC) layer.

6. The method of claim 4, wherein the PDCP agent includes a user plane that is virtualized for co-location with the device.

7. The method of claim 1, further comprising:
    obtaining, from a second user device, a second packet,
        wherein the second packet is associated with a second packet flow;
    comparing information regarding the second packet flow and the application identifiers;
    determining that the second packet is destined for the low-latency application having the specified latency range based on a second result of comparing the information regarding the second packet flow and the application identifiers;
    identifying a second low-latency bearer configured to satisfy the specified latency range associated with the low-latency application;
    mapping the second packet flow to the second low-latency bearer;
    mapping the first low-latency bearer to the second low-latency bearer; and
    communicating a plurality of packets between the first user device and the second user device based on a mapping between the first low-latency bearer and the second low-latency bearer.

8. A device for wireless communication, comprising:
    a memory; and
    one or more processors operatively coupled to the memory, the memory and the one or more processors configured to:
        obtain, from a node in a core network, application identifiers associated with applications accessible by a first user device,
            wherein the application identifiers are associated with latency requirements;
        compare information regarding a first packet flow and the application identifiers,
            wherein the first packet flow is associated with a request communication session associated with the first user device;
        determine that a first packet associated with the first packet flow is destined for a low-latency application based on comparing the information regarding the first packet flow and the application identifiers;
        identify a first low-latency bearer configured to satisfy a specified latency range associated with the low-latency application; and
        communicate packets, associated with the first packet flow, using the first low-latency bearer,
            wherein the packets are communicated between an entity hosting the low-latency application and the first user device, while bypassing the core network.

9. The device of claim 8, wherein the one or more processors are further to:
map the first packet flow to the first low-latency bearer prior to communicating the packets using the first low-latency bearer.

10. The device of claim 8, wherein a Packet Data Convergence Protocol (PDCP) agent is configured to determine that the first packet is destined for the low-latency application.

11. The device of claim 10, wherein the PDCP agent includes a user plane that is virtualized for co-location with the device.

12. The device of claim 8, wherein the specified latency range is less than 10 milliseconds.

13. The device of claim 8, wherein the one or more processors are further configured to:
obtain, from a second user device, a second packet,
wherein the second packet is associated with a second packet flow;
compare information regarding the second packet flow and the application identifiers;
determine that the second packet is destined for the low-latency application having the specified latency range based on a second result of comparing the information regarding the second packet flow and the application identifiers;
identify a second low-latency bearer configured to satisfy the specified latency range associated with the low-latency application;
map the second packet flow to the second low-latency bearer;
map the first low-latency bearer to the second low-latency bearer; and
communicate a plurality of packets between the first user device and the second user device based on a mapping between the first low-latency bearer and the second low-latency bearer.

14. The device of claim 13, wherein the first user device and the second user device are one of:
a drone,
a vehicle,
a gaming device,
a phone, and/or
a computer.

15. A non-transitory computer-readable medium storing one or more instructions for wireless communication, the one or more instructions comprising:
one or more instructions that, when executed by one or more processors of a device, cause the one or more processors to:
obtain, from a node in a core network, application identifiers associated with applications accessible by a first user device,
wherein the application identifiers are associated with latency requirements;
obtain, from the first user device, a first packet,
wherein the first packet is included in a first packet flow, and
wherein the first packet flow is associated with a request communication session associated with the first user device;
determine that the first packet is destined for a low-latency application having a specified latency range based on comparing information associated with the first packet flow and information associated with the application identifiers;
identify a first low-latency bearer configured to satisfy the specified latency range associated with the low-latency application; and
map the first packet flow to the first low-latency bearer.

16. The non-transitory computer-readable medium of claim 15, wherein the one or more instructions, when executed by the one or more processors, further cause the one or more processors to:
communicate packets, associated with the first packet flow, using the first low-latency bearer,
wherein the packets are communicated between an entity hosting the low-latency application and the first user device, while bypassing the core network.

17. The non-transitory computer-readable medium of claim 15, wherein a Packet Data Convergence Protocol (PDCP) agent is configured to determine that the first packet is destined for the low-latency application.

18. The non-transitory computer-readable medium of claim 17, wherein the PDCP agent is configured to obtain the first packet by way of a mapping table provided at a radio link control (RLC) layer.

19. The non-transitory computer-readable medium of claim 15, wherein the specified latency range is less than 10 milliseconds.

20. The non-transitory computer-readable medium of claim 15, wherein the one or more instructions, when executed by the one or more processors, further cause the one or more processors to:
obtain, from a second user device, a second packet,
wherein the second packet is associated with a second packet flow;
determine that the second packet is destined for the low-latency application having the specified latency range based comparing information associated with the second packet flow and the information associated the application identifiers;
identify a second low-latency bearer configured to satisfy the specified latency range associated with the low-latency application;
map the second packet flow to the second low-latency bearer;
map the first low-latency bearer to the second low-latency bearer; and
communicate a plurality of packets between the first user device and the second user device based on a mapping between the first low-latency bearer and the second low-latency bearer.

* * * * *